(No Model.)

J. P. BALL.
NUT LOCK.

No. 383,685. Patented May 29, 1888.

WITNESSES:
Th. Rollé
James F. Kelly

INVENTOR
James P. Ball
BY
ATTORNEYS.

UNITED STATES PATENT OFFICE.

JAMES P. BALL, OF PHILADELPHIA, PENNSYLVANIA.

NUT-LOCK.

SPECIFICATION forming part of Letters Patent No. 383,685, dated May 29, 1888.

Application filed September 26, 1887. Serial No. 250,657. (No model.)

*To all whom it may concern:*

Be it known that I, JAMES P. BALL, a citizen of the United States, residing in the city and county of Philadelphia, State of Pennsylvania, have invented a new and useful Improvement in Nut-Locks, which improvement is fully set forth in the following specification and accompanying drawings.

My invention relates to improvements in nut-locks; and to this end it consists in a locking-piece made of a single piece of wire and bent, as shown, to have its opposite ends bear, respectively, against the fish-plate and nut.

It will be better understood by reference to the accompanying drawings, in which—

Figure 1:
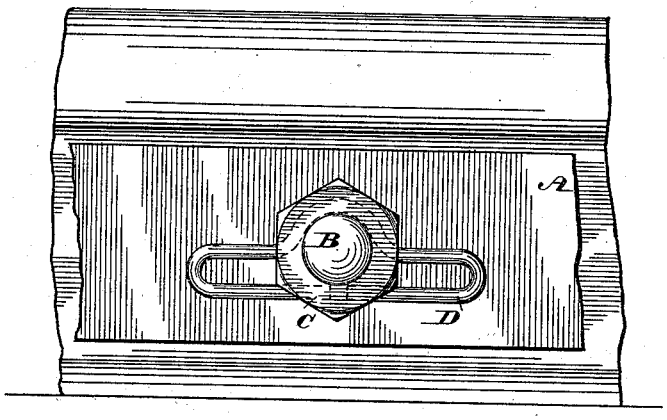
Figure 2:
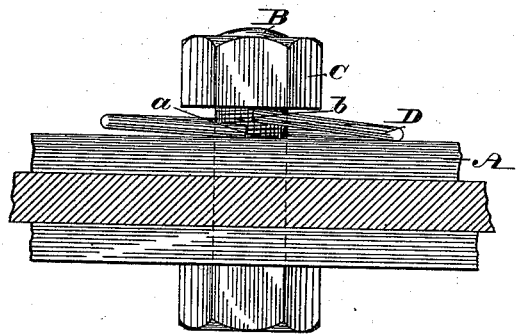
Figure 3:
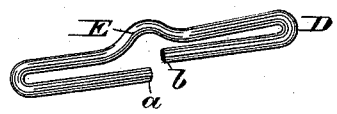

Figure 1 represents a side elevation of a nut-lock embodying my invention. Fig. 2 represents a top view of the same. Fig. 3 represents a perspective view thereof.

Similar letters of reference indicate corresponding parts in the several figures.

Referring to the drawings, A represents the fish-plate; B, the bolt, and C the nut, while D is the nut-lock. To construct this nut-lock, I take a piece of wire—preferably steel wire—and bend it, as shown in Fig. 3, so as to make a loop or eye, E, in its middle adapted to the size or shape of the bolt B. I then bend the ends so that one projects or bears when in locking position against the fish or other plate, and the other end against the nut.

The operation is as follows: I screw the nut down upon the lock and it is thereby caused to bite one end, *a*, into the fish-plate and the other end, *b*, into the nut, so as to prevent the latter from turning.

Of course it is to be understood that this nut-lock can be applied to lock-nuts in any places where it is desired to use it, but is especially designed for use on railways, as shown in the drawings.

I am aware that it is not new to construct a nut-fastener having a spring piece or washer with one of its ends adapted to bear against the nut and the other end to bear against the fish-plate, and such I do not claim; but I am not aware that it is old to construct the said spring piece as herein described, wherein the sides of the two ends thereof approach so near the bolt as to prevent the spring from being displaced laterally therefrom and the eye part kept in contact with the periphery of the bolt, thus obviating the slipping of the fastener and spreading of the end limbs thereof.

Having thus described my invention, what I claim as new, and desire to secure by Letters Patent, is—

A nut-fastener consisting of a spring-piece having an eye coinciding with the periphery of the bolt near its center and on one side thereof, and having one of its ends projecting upward and the other end projecting downward, the sides of said ends being opposite the eye and so located in relation to the bolt as to prevent the disengagement of the said piece laterally from the bolt, substantially as described.

JAMES P. BALL.

Witnesses:
JOHN A. WIEDERSHEIM,
A. P. JENNINGS.